United States Patent
Joshi

(10) Patent No.: US 12,361,942 B1
(45) Date of Patent: Jul. 15, 2025

(54) DEVICE CONTROL USING VARIABLE STEP SIZE OF ACOUSTIC ECHO CANCELLATION

(71) Applicant: Amazon Technologies, Inc., Seattle, WA (US)

(72) Inventor: Aditya Sharadchandra Joshi, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 386 days.

(21) Appl. No.: 17/835,201

(22) Filed: Jun. 8, 2022

(51) Int. Cl.
*G10L 15/22* (2006.01)
*G10L 15/30* (2013.01)
*G10L 21/0208* (2013.01)

(52) U.S. Cl.
CPC .............. *G10L 15/22* (2013.01); *G10L 15/30* (2013.01); *G10L 21/0208* (2013.01); *G10L 2021/02082* (2013.01)

(58) Field of Classification Search
None
See application file for complete search history.

(56) References Cited

U.S. PATENT DOCUMENTS

| | | | |
|---|---|---|---|
| 7,333,605 B1 * | 2/2008 | Zhang | H04M 9/082 379/406.08 |
| 10,586,534 B1 * | 3/2020 | Argyropoulos | G10L 15/22 |
| 2010/0057454 A1 * | 3/2010 | Mohammad | H04B 3/234 704/E15.001 |
| 2016/0127527 A1 * | 5/2016 | Mani | G10L 21/0208 379/388.07 |
| 2019/0074025 A1 * | 3/2019 | Lashkari | H04B 3/23 |
| 2020/0043507 A1 * | 2/2020 | Giacobello | G10L 21/0208 |
| 2022/0310106 A1 * | 9/2022 | Nguyen | G10K 11/17854 |

* cited by examiner

*Primary Examiner* — Bhavesh M Mehta
*Assistant Examiner* — Jangwoen Lee
(74) *Attorney, Agent, or Firm* — K&L Gates LLP

(57) ABSTRACT

Devices and techniques are generally described for wake word suppression using variable step size of an acoustic echo cancellation (AEC) unit. A reference signal representing an audio stream may be sent to an acoustic echo cancellation (AEC) unit. A microphone may receive an input audio signal and send the input audio signal to the AEC unit. The AEC unit may determine a first set of variable step size (Vss) values over the first time period. Vss values may define a rate at which the AEC unit determines a transfer function between the reference signal and the first input audio signal. A wake-word may be detected during the first time period. A determination may be made that the wake-word is part of the audio output by the loudspeaker based at least in part on the first set of Vss values.

20 Claims, 8 Drawing Sheets

DEVICE CONTROL USING VARIABLE STEP SIZE OF ACOUSTIC ECHO CANCELLATION

BACKGROUND

Speech recognition and/or automatic speech recognition (ASR) combined with language processing techniques may allow a user to control a computing device to perform tasks based on the user's spoken commands. Such speech recognition and voice control may be used by computers, handheld devices, telephone computer systems, home and/or personal assistant devices, and other internet-enabled devices. In various examples, speech recognition and/or voice-controlled devices may activate upon detection of a spoken "wake-word" or "wake command". Thereafter, the device may record spoken commands by the user and may process the command (and/or may send the command to one or more other devices for processing) in order to translate the recording into executable instructions. The executable instructions may be executed and some task may be performed in response to the execution of the executable instructions. For example, after activating (e.g., "waking up") a voice-controlled device with a spoken wake-word, a user may speak a spoken command to the voice-controlled device to perform some action.

DETAILED DESCRIPTION

Figure 1:
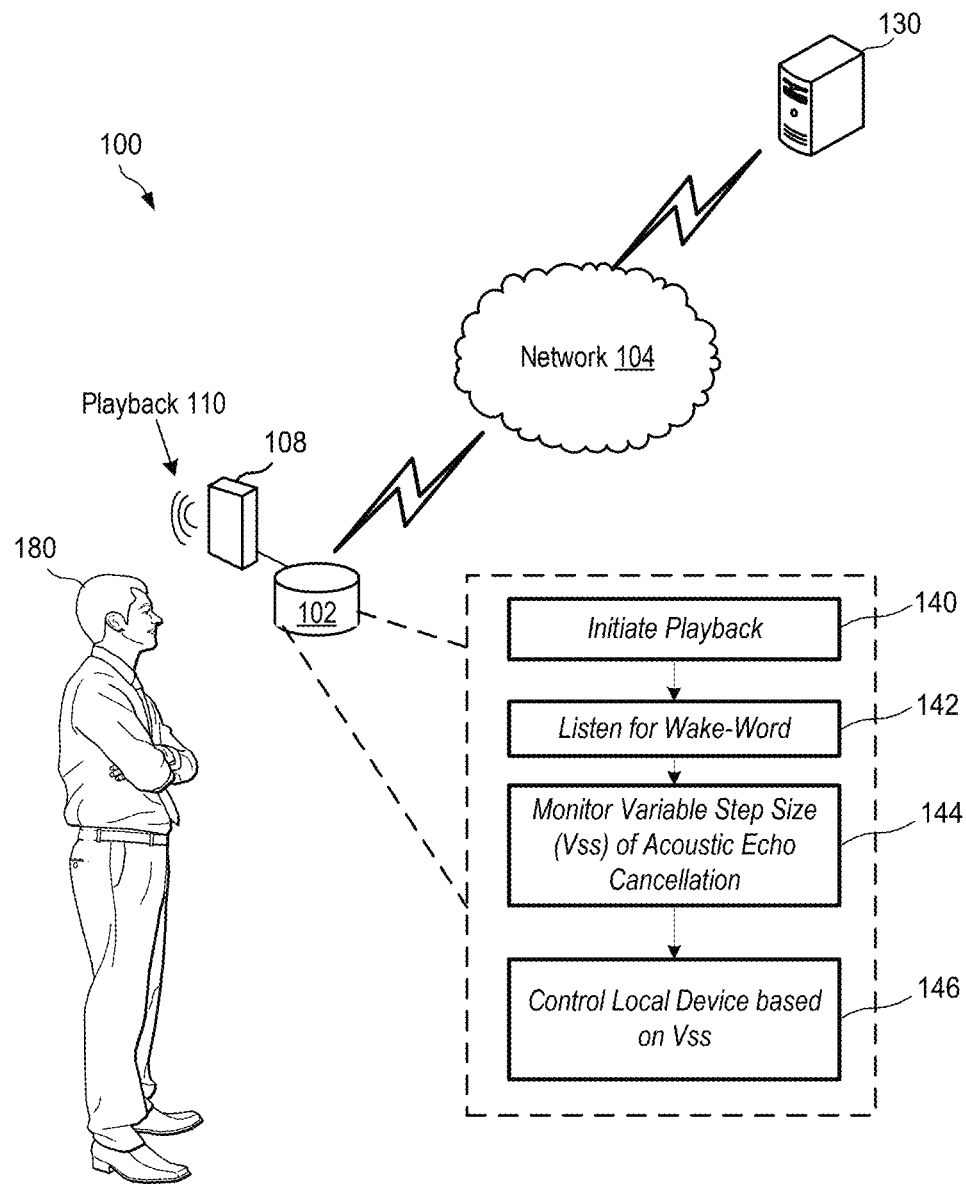
FIG. 1 illustrates a system effective to control an automatic speech recognition device using acoustic echo cancellation statistics, in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Various examples described herein are directed to systems and methods for wake-word false trigger prevention during audio playback and other methods of controlling an automatic speech recognition (ASR) enabled device based on the variable step size of an acoustic echo cancellation unit. During audio playback a part of the audio may acoustically resemble a wake-word of a voice-controlled device. Accordingly, detection of the part of the audio resembling the wake-word may trigger a wake-word engine and may enable further speech-recognition processing. Triggering of the wake-word engine may cause playback of the audio to be paused or attenuated while the voice-controlled device "listens" for a speech command. In various examples, a voice-controlled device may listen for a speech command by receiving and analyzing audio captured through a microphone of the voice-controlled device. When a valid wake-word is detected, audio may be recorded for further processing. For example, recorded audio may be sent to a speech recognition server (and/or processed locally) for translation into an executable command or for other processing. Pausing audio playback due to a wake-word present or detected from the audio stream can be confusing to a user. Additionally, pausing audio playback due to a wake-word present or detected from the audio stream can result in a portion of the audio playback not being heard by the user due to attenuation of the audio playback signal while the voice-controlled device is pausing playback. Additionally, in some examples, a portion of the audio playback following a detected wake-word may be interpreted as a speech command. The techniques described herein allow for a computationally efficient means of distinguishing between a wake-word spoken by a user and a wake-word (or audio acoustically similar to a wake-word) present in audio playback. Wake-words determined to be present in the audio playback (and not spoken by a user) may be rejected without pausing or attenuating the playback audio. When a detected wake-word is accepted, current playback may be paused or attenuated and subsequent audio may be recorded so that the device receives a clear audio signal representing any subsequently-spoken command/request. Conversely, when a detected wake-word is rejected (e.g., using various techniques described herein), current playback may continue without pause/attenuation. Additionally, when a wake-word is rejected subsequent audio may not be recorded and/or transmitted for further natural language processing (since the wake-word has been determined to be a false trigger).

In some examples, it may be possible to employ a secondary wake-word engine to monitor downlink audio (e.g., playback audio from the voice-controlled device) to detect the presence of a wake-word separately. However, such a solution may not be appropriate for resource-constrained platforms, such as, for example, voice-controlled devices with little on-device processing power and/or memory and/or voice-controlled devices with power consumption concerns. Accordingly, the solutions described herein leverage an existing parameter of acoustic echo cancellation (AEC) to determine whether or not a detected wake-word was generated by downlink audio or by a user utterance (e.g., a user-spoken wake-word).

Automatic speech recognition (ASR) is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language, resulting in specific executable command data or other type of instructions. As described in further detail below, in some examples, NLU processing may include multiple different processes that may be executed for a given natural language input in order to determine a semantic interpretation of the natural language input. Natural language generation (NLG) is a computer-based process that may be used to produce natural language output. Text-to-speech (TTS) is a field of computer science, artificial intelligence, and linguistics concerned with enabling computers to output synthesized speech. ASR, NLU, and TTS may be used together as part of a natural language processing system. As used in, natural language input data may comprise audio data (e.g., representing a user request or command), text data, and/or other representation data representing natural language for input into a natural language processing system.

As used herein, user utterances, input text data, and/or any form of data input to a natural language processing system ("input data") may be described by "request data" and/or "user request data." Such request data may change forms many times during processing of the request data by various components of the speech processing system. For example, initially the request data may be audio data and/or input text data representing a user question. The audio data may be transformed into text data and/or other ASR output data by an ASR component of the speech processing system. The text data and/or other ASR output data may be transformed into intent data by an NLU component of the speech processing system. The intent data may be used by a speech processing application (e.g., a skill) to perform an action (e.g., to generate action data (e.g., computer-executable instructions) that may be processed in order to take some corresponding action such as answering a user's question, playing video, playing audio, etc.). "Request data" and/or "user request data" may refer to any data related to an input request to a speech processing system (e.g., including the various data forms described above, as each of the aforementioned data types relate to an input request to the speech processing system). In general, as used herein, natural language processing "applications" may be any software (and/or combination of software and hardware) used during natural language processing to take an action in response to input request data (e.g., natural language inputs such as user utterances and/or text). Such applications may include speech processing skills and/or other types of speech processing software.

The various techniques described herein may be used in a variety of contexts, including in natural language processing enabled devices (e.g., devices employing voice control and/or speech processing "voice assistants") and/or systems. Examples of speech processing systems and/or voice-enabled personal assistants include the Siri system from Apple Inc. of Cupertino, California, voice-enabled actions invoked by the Google Assistant system from Google LLC of Mountain View, California, Dragon speech recognition software and the Cortana system from Microsoft of Redmond, Washington, the Alexa system from Amazon.com, Inc. of Seattle, Washington, etc. The various natural language processing techniques described herein may be executed on any type of computing device. Some example natural language processing enabled devices may include mobile devices (e.g., on a user's phone, laptop, etc.), smart speakers, embedded systems (e.g., smart lights, smart appliances), vehicle computing systems, desktop devices, etc.

Natural language processing enabled devices may include one or more microphones (e.g., far-field microphone arrays) used to transform audio into electrical signals. After detection of a valid wake-word, speech processing may be performed, either locally by the speech processing enabled device, by one or more other computing devices communicating with the speech processing enabled device over a network, or by some combination of the natural language processing enabled device and the one or more other computing devices. In various examples, natural language processing enabled devices may include and/or may be configured in communication with speakers and/or displays effective to output information obtained in response to a user's spoken request or command, and/or to output content that may be of interest to one or more users.

Storage and/or use of data related to a particular person or device (e.g., device names, names of device groups, contextual data, and/or any personal data) may be controlled by a user using privacy controls associated with a speech processing enabled device and/or a companion application associated with a speech processing enabled device. Users may opt out of storage of personal, device state (e.g., a paused playback state, etc.), and/or contextual data and/or may select particular types of personal, device state, and/or contextual data that may be stored while preventing aggregation and storage of other types of personal, device state, and/or contextual data. Additionally, aggregation, storage, and use of personal, device state, and/or contextual information, as described herein, may be compliant with privacy controls, even if not legally subject to them. For example, personal, contextual, device state, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the device and/or device group names and/or any data captured by such devices may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

In various examples, a natural language processing enabled device may include a wake-word detection component. The wake-word detection component may process audio data captured by microphones of the speech processing enabled device and may determine whether or not a keyword (e.g., a wake-word) is detected in the audio data. When a wake-word is detected, the speech processing enabled device may enter a "sending mode" in which audio detected by the microphones following the wake-word (e.g., data representing user request data spoken after the wake-word) may be sent to natural language processing computing component(s) (either locally or remotely) for further natural language processing (e.g., ASR, NLU, etc.). In various examples, the wake-word detection component may be used to distinguish between audio that is intended for the natural language processing system and audio that is not intended for the natural language processing system.

FIG. 1 illustrates a system 100 effective to control a voice-controlled device using variable step size (Vss) of an acoustic echo cancellation (AEC) unit to prevent wake-word false triggering during audio playback or to otherwise control the voice-controlled device, in accordance with various aspects of the present disclosure. The system may include a local device 102. The local device 102 may include a wake-word detection component and/or speech processing capability. In some examples, the system 100 may include a remote device 130 in communication with the local device (and/or other devices) via a network 104. The local device 102 may be configured to receive and respond to wake-words and execute audible commands. In an example, the local device 102 may be listening for a wake-word or an audible command to operate the local device 102. In the example depicted in FIG. 1, user 180 may have previously used a wake-word to activate local device 102 and issued an audio command to initiate playback, as illustrated in block 140. Initiation of playback may comprise streaming music, text to speech (TTS), a voice-over-IP call and/or other audio to local device 102. Local device 102 may send audio to loudspeaker 108 for playback 110 of the audio. In various examples, loudspeaker 108 may be integrated within local device 102 or may be a stand alone speaker effective to receive an audio signal from local device 102 or from a remote computing device via network 104.

At block 142, during downlink audio playback, local device 102 may be listening for a wake-word. In this context "listening" refers to continuously recording a short period of audio (e.g., <2 seconds of audio or some other appropriate value) in a rolling buffer. The audio stored in the buffer may be evaluated to determine if a wake-word is represented in the audio. The contents of the buffer may be continually overwritten so that only the most recent 2 second of audio may be stored at any given time (to preserve user privacy). If the wake-word is determined by the various techniques described herein to be provided by a user utterance, audio playback may be paused and/or attenuated in order to better receive and interpret a spoken command from the user that follows the wake-word. However, if the wake-word is determined by the various techniques described herein to be provided by the downlink audio playback, local device 102 may ignore the wake-word without attenuating, pausing, or otherwise interrupting the audio playback to process the subsequent audio for commands.

Local device 102 may comprise an acoustic echo cancellation (AEC) component. The AEC is used to attenuate the echo of the playback 110 from the loudspeaker as detected by a microphone of local device 102 in the uplink channel. Depending on the volume of playback 110, the nature of the audio of playback 110 (e.g., voice, music, etc.), and/or on the acoustics of a particular space in which loudspeaker 108 and local device 102 are located, the echo from playback 110 picked up by the microphone of local device 102 may be significant. Accordingly, the AEC removes echo in the uplink channel due to playback 110 by modeling the loudspeaker-enclosure-microphone transfer function path (e.g., modeling the acoustic space in which the loudspeaker and microphone are situated) while maintaining the near-end speech undistorted.

A challenge for AEC is determining the filtering to be applied to the far-end signal (e.g., the playback signal received by the microphone) so that it resembles the near-end signal (e.g., the reference signal of the downlink audio). AEC uses an adaptive filter to model the speaker, microphone, and the acoustic attributes of the physical space in which the microphone and speaker are situated. The far-end signal is used as a stimulus to allow the adaptive filter of the AEC to converge from providing no echo cancellation to a significant amount of cancellation (e.g., up to 55 dB or some other value, depending on the adaptive filter architecture used) within short time periods. The rate at which the adaptive filter of the AEC converges (e.g., adapts to the changing downlink audio and/or changing acoustic conditions) is referred to as the variable step size (Vss) of the AEC unit. Higher Vss values cause the adaptive filter of the AEC to converge more quickly relative to lower Vss values. Adaptation of an adaptive finite impulse response (FIR) filter refers to calculating the filter coefficients.

The convergence of the adaptive filter (e.g., an adaptive finite impulse response (FIR) fitler) of the AEC is tuned to avoid converging too quickly. If the adaptive filter converges to near end speech (e.g., a user speaking the wake-word), the speech will be attenuated by the AEC resulting in poor detection of user speech and/or poor performance of speech processing components. However, when downlink audio (e.g., music, TTS, etc.) begins playback on a loudspeaker, the adaptive filter of the AEC should converge quickly so that echo is filtered out and near end speech can be detected. The Vss is increased and decreased by performing cross correlation between the reference signal (e.g., the far-end signal) and the AEC output signal. Cross-correlation is a measure of similarity (or difference) between the two signals as a function of the displacement of one signal relative to the other. In general, high correlation indicates that output of audio front end is mostly residual (indicating that most of the microphone input is similar to the reference signal). Such high correlation generally results in increased Vss rates where the adaptive FIR of the AEC converges relatively quickly. Low correlation indicates that there is near end activity being detected by the microphone (e.g., user speech or other noises). Such low correlation causes Vss to decrease to avoid the adaptive FIR converging on near-end speech. Vss is independent of loudspeaker playback volume. The various techniques described herein for wake-word suppression (and/or false wake-word detection) may be applicable for any techniques used to increase and/or decrease Vss for AEC. Accordingly, at block 144 the local device 102 may monitor Vss of the AEC. As described in further detail below, the local device 102 may be controlled based on the Vss (block 146). For example, the Vss may be used to distinguish between user-spoken wake-words and wake-words (or other audio detected as wake-words) in the downlink audio. In general, if the current Vss is high (e.g., above a threshold Vss value) and/or is increasing at a rate that is higher than a threshold rate during a period when a wake-word is detected, the various techniques described herein may be used to suppress the wake-word detection and continue playback of the downlink audio. Conversely, if the Vss is low and/or is decreasing at a rate that is higher than a threshold rate during a period when a wake-word is detected, the various techniques described herein may be used to accept the wake-word and attenutate audio playback in order to perform further speech processing.

A metric for measuring the attenuation of the energy of the echo by the AEC is referred to as Echo Return Loss Enhancement (ERLE). In general, when the AEC filter has converged (e.g., within a few seconds from boot up of a voice-controlled device), the ERLE of the voice-controlled device with a good loudspeaker may be about 25 dB on average. ERLE performance (and AEC performance) may vary based on several factors such as a distance between the loudspeaker 108 and a microphone of local device 102, distortion of loudspeaker 108, echo path changes (EPC), convergence/tracking speed of AEC, and/or the amount of residual echo (RE). In some cases, a decline in ERLE values of the AEC may be used to detect whether a wake-word was spoken by a user or was present in the downlink audio. This is because if the wake-word is spoken by a user there is no corresponding portion of the downlink audio to cancel, resulting in a drop in ERLE values. Accordingly, ERLE may be used to distinguish between wake-words present in the playback vs. user-spoken wake-words. However, using ERLE for wake-word suppression may not be ideal because ERLE is affected by non-linearities of the loudspeaker as well as different playback volumes. Accordingly, in order to ensure good performance in ERLE-based wake-word suppression, the algorithms are tuned for each volume setting and for each loudspeaker/device type, rendering ERLE systems difficult to scale. However, the Vss-based wake-word suppression systems and techniques described herein offer consistent performance across all volume settings and loudspeaker types/characteristics.

Figure 2:
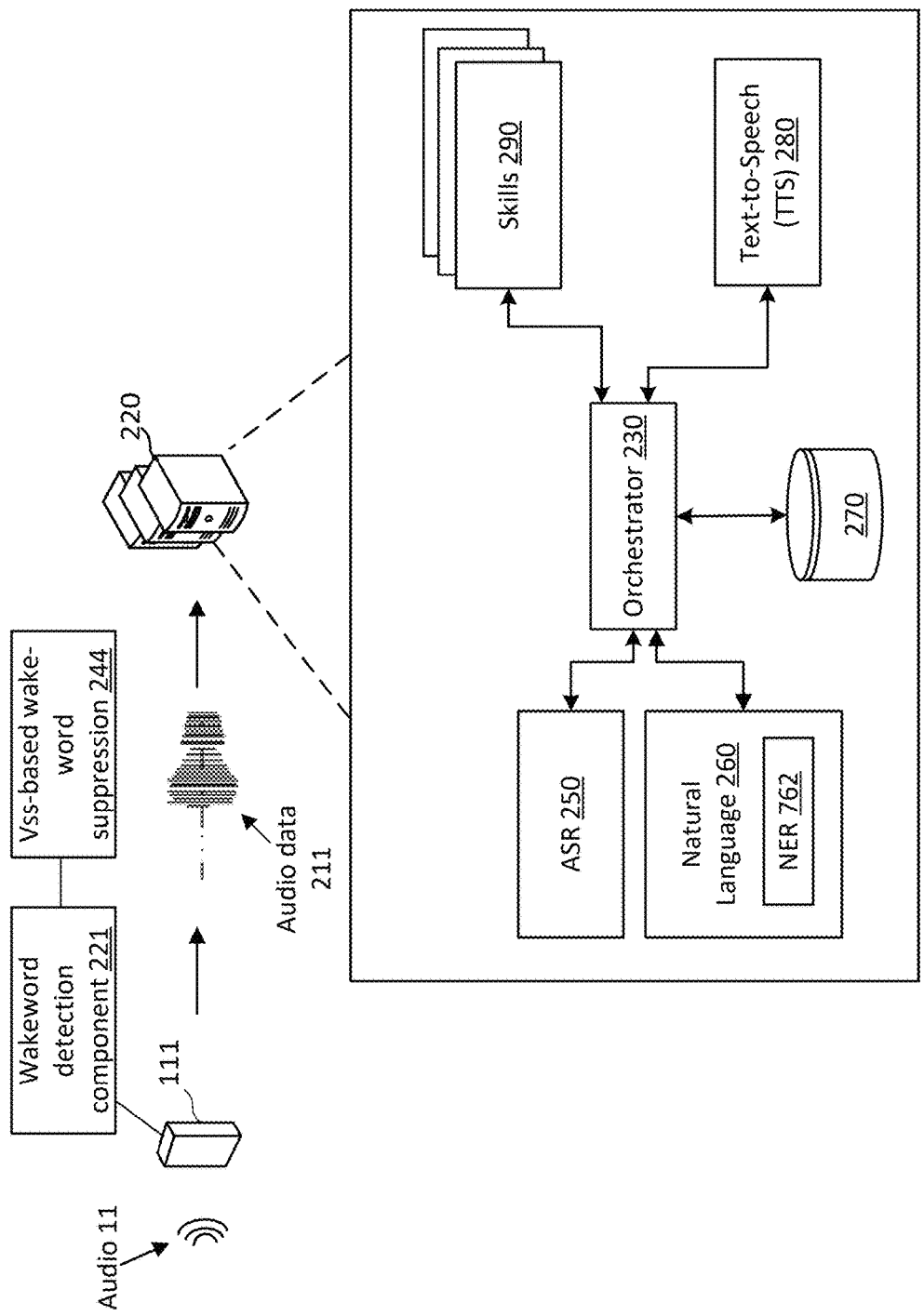
FIG. 2 is a block diagram of various components of a natural language processing system that may be used in accordance with various aspects of the present disclosure.

FIG. 2 is a block diagram of various components of a natural language processing system 220 that may be used in accordance with various aspects of the present disclosure. Although not necessarily limited to such, the system may operate using various natural language processing components as described in FIG. 2. The various components may be located on same or different physical devices. Communication between various components may occur directly or across a network(s). For example, ASR output data (e.g., text data representing a current utterance) output by ASR component 250 may be used to determine an intent of the utterance by NLU component 260. Thereafter, orchestrator component 230 may route the intent to one or more skill components 290 effective to process the intent (as well as slot data included in the utterance) to perform an action. In some cases, the action may include output of synthesized speech using the TTS component 280.

An audio capture component(s), such as a microphone or array of microphones of the device 111 (e.g., a network-connected device that is enabled with natural language processing capability), captures audio 11. The device 111 processes audio data, representing the audio 11, to determine whether speech is detected. The device 111 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 111 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 111 may use a wake-word detection component 221 to perform wake-word detection to determine whether a wake-word was detected in the audio 11. This process may also be referred to as keyword detection, with a wake-word being a specific example of a keyword. An example wake-word is "Alexa," "Computer," etc.

Wake-word detection is typically performed without performing linguistic analysis, textual analysis, or semantic analysis. Instead, the audio data representing the audio 11 may be analyzed to determine if specific characteristics of the audio data match preconfigured acoustic waveforms, audio signatures, or other data to determine if the audio data "matches" stored audio data corresponding to a wake-word. The stored audio data may be provided by the natural language processing system 220 and/or may be provided by the user. Vss-based wake-word suppression 244 may be used to determine whether any detected wake-word was present in the downlink audio (e.g., the audio being output by the loudspeaker) or whether the detected wake-word was near-end speech.

The wake-word detection component 221 may compare audio data to stored models or data to detect a wake-word. One approach for wake-word detection applies general large vocabulary continuous speech recognition (LVCSR) systems to decode audio signals, with wake-word searching being conducted in the resulting lattices or confusion networks. LVCSR decoding may require relatively high computational resources. Another approach for wake-word spotting builds HMMs for each wake-word and non-wake-word speech signals, respectively. The non-wake-word speech includes other spoken words, background noise, etc. There can be one or more HMMs built to model the non-wake-word speech characteristics, which are named filler models. Viterbi decoding is used to search the best path in the decoding graph, and the decoding output is further processed to make the decision on wake-word presence. This approach can be extended to include discriminative information by incorporating a hybrid Deep Neural Network (DNN)-HMM decoding framework. In another example, the wake-word detection component 221 may be built on deep neural network (DNN)/recursive neural network (RNN) structures directly, without HIMM being involved. Such an architecture may estimate the posteriors of wake-words with context information, either by stacking frames within a context window for DNN, or using RNN. Follow-on posterior threshold tuning or smoothing is applied for decision making. Other techniques for wake-word detection, such as those known in the art, may also be used.

Once the wake-word is detected (and is accepted by Vss-based wake-word suppression 244), the device 111 may wake and begin sending audio data 211, representing the audio 11, to the natural language processing system 220. The natural language processing system 220 may be executed by one or more remote devices, by the device 111, and/or by some combination of such devices. The audio data 211 may include data corresponding to the wake-word, or the portion of the audio data 211 corresponding to the wake-word may be removed by the device 111 prior to sending the audio data 211 to the natural language processing system 220.

Upon receipt by the natural language processing system 220, the audio data 211 may be sent to an orchestrator component 230. The orchestrator component 230 may include memory and logic that enable the orchestrator component 230 to transmit various pieces and forms of data to various components of the system, as well as perform other operations. The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent (e.g., intent data) representing an action that a user desires be performed as well as pieces of the input text data that allow a device (e.g., the device 111, the natural language processing system 220, etc.) to execute the intent. For example, if the text data corresponds to "call John," the NLU component 260 may determine an intent that the system establish a two-way communication channel between the device 111 originating the call and a device of the recipient "John" (a named entity in the utterance). For further example, if the text data corresponds to "turn up volume on Artist X," the NLU component 260 may determine an intent that the system turn up the volume of playback. Named entity recognition 762 (NER component 762) may be used to determine the slot data "Artist X" in the example request.

The NLU component 260 outputs NLU results to the orchestrator component 230. The NLU results may include an NLU hypothesis, including a representation of an intent and corresponding slot data (e.g., "Artist X" in the prior example) that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

The orchestrator component 230 may send the NLU results to an associated skill component 290. If the NLU results include multiple NLU hypotheses, the orchestrator component 230 may send a portion of the NLU results corresponding to the top scoring NLU hypothesis to a skill component 290 associated with the top scoring NLU hypothesis. The selection of a skill component 290 to which to route a natural language input may be determined using one or more routing and/or skill selection machine learning models.

A "skill" or "skill component" may be software running on the natural language processing system 220 that is akin to a software application running on a traditional computing device. That is, a skill component 290 may enable the natural language processing system 220 to execute specific functionality in order to perform one or more actions (e.g., provide information to a user, display content to a user, output music, or perform some other requested action). The natural language processing system 220 may be configured with more than one skill component 290. For example, a weather skill component may enable the natural language processing system 220 to provide weather information, a ride sharing skill component may enable the natural language processing system 220 to schedule a trip with respect to a ride sharing service, a restaurant skill component may enable the natural language processing system 220 to order food with respect to a restaurant's online ordering system, a communications skill component may enable the system to perform messaging or multi-endpoint communications, etc. A skill component 290 may operate in conjunction between the natural language processing system 220 and other devices such as the device 111 or a gateway system in order to complete certain functions. Inputs to a skill component 290 may come from various interactions and input sources.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the natural language processing system 220 (as illustrated in FIG. 2) or may be located at whole (or in part) with one or more separate systems. Unless expressly stated otherwise, reference to a skill, skill device, or skill component may include a skill component operating within the natural language processing system 220 (for example as skill component 290) and/or skill component operating within a system separate from the natural language processing system 220.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the natural language processing system 220, a ride sharing skill may involve a ride sharing skill component scheduling a trip with respect to a ride sharing service, an order pizza skill may involve a restaurant skill component ordering pizza with respect to a restaurant's online ordering system, etc.

A skill component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs, smart speakers, etc.), video skills, flash briefing skills, gaming skills, as well as custom skills that are not associated with any pre-configured type of skill. A skill may also be associated with media operations that may be performed by an media processing unit (MPU). This allows a skill develop to offer media processing features an independent services that may be invoked by a user. For example, a user may say "Alexa, call mom using CatFace" which may result in the system processing the command to initiate a device-to-device video call between the user's device and a device belonging to the user's mother, while routing the video call through an MIPU associated with the "CatFace" skill, which may perform media operations such as recognizing a human face and replacing it with a cat face. As can be appreciated, many different media processing skills may be implemented.

The natural language processing system 220 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The natural language processing system 220 may include profile storage 270 and/or the gateway system may include its own profile storage. The profile storage 270 may include a variety of information related to individual users, groups of users, etc. that interact with the system. The profile storage 270 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270 may include one or more group profiles and/or the person identifier data and/or account identifier data described herein. Each group profile may be associated with a different group identifier. A group profile may be specific to a group of users and/or a group of devices. That is, a group profile may be associated with two or more individual user profiles and/or device profiles. For example, a group profile may be a household profile that is associated with user profiles and/or device profiles associated with multiple users of a single household. A group profile may include preferences shared by all the user profiles and/or device profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. Although depicted in FIG. 2 as a separate component, natural language processing system 220 may be executed wholly or partially by device 111.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and objects in which the component(s) of the system(s) and/or user are located. Permissions may be obtained from a user associated with the device 111, or other devices discussed herein.

Figure 3:
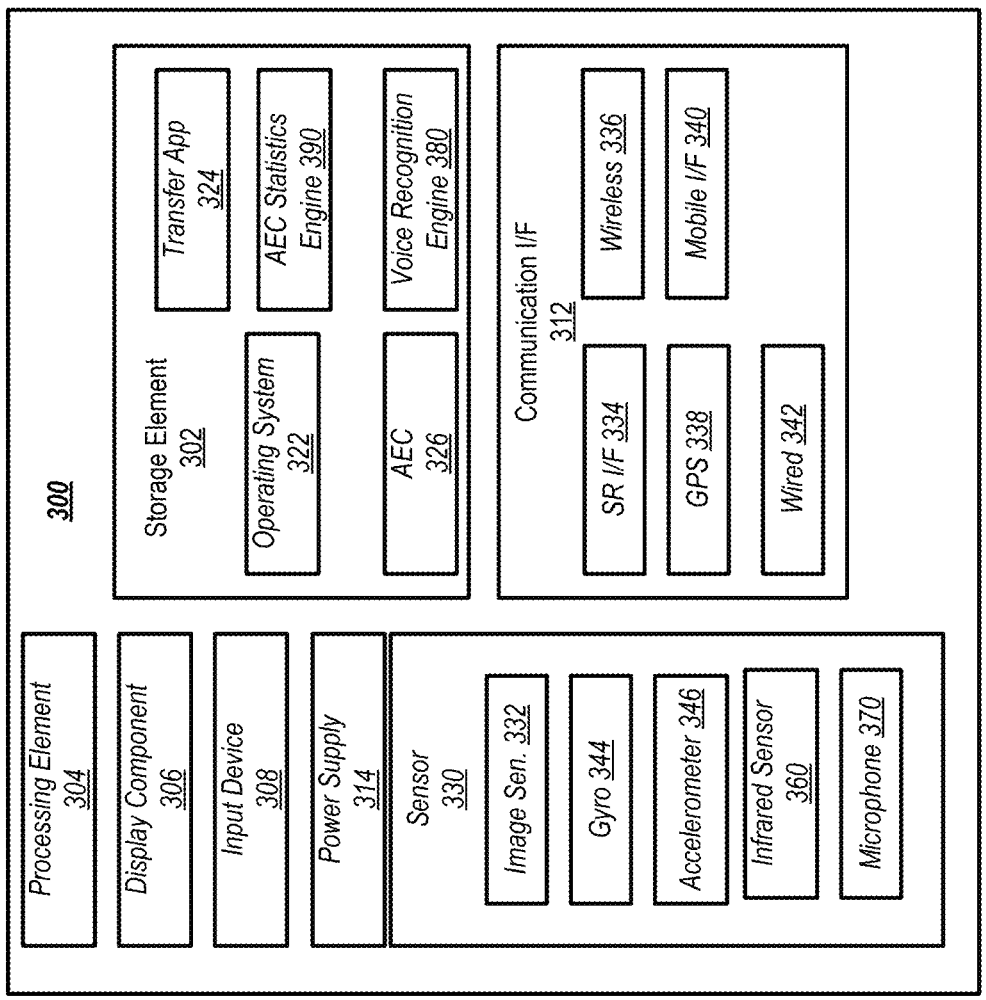
FIG. 3 is a block diagram showing an example architecture of a computing device in which the system to control a device using variable step size of an acoustic echo cancellation unit may be implemented, in accordance with various embodiments described herein.

FIG. 3 is a block diagram showing an example architecture 300 of a user device, such as local device 102, in accordance with various aspects of the disclosure. It will be appreciated that not all user devices will include all of the components of the architecture 300 and some user devices may include additional components not shown in the architecture 300. The architecture 300 may include one or more processing elements 304 for executing instructions and retrieving data stored in a storage element 302. The processing element 304 may comprise at least one processor. Any suitable processor or processors may be used. For example, the processing element 304 may comprise one or more digital signal processors (DSPs). In some examples, the processing element 304 may be effective to monitor AEC statistics (e.g., ERLE, Vss, the existence of a double talk condition, etc.) and to perform acoustic echo cancellation. The storage element 302 can include one or more different types of memory, data storage, or computer-readable storage media devoted to different purposes within the architecture 300. For example, the storage element 302 may comprise flash memory, random-access memory, disk-based storage, etc. Different portions of the storage element 302, for example, may be used for program instructions for execution by the processing element 304, storage of images or other digital works, and/or a removable storage for transferring data to other devices, etc.

The storage element 302 may also store software for execution by the processing element 304. An operating system 322 may provide the user with an interface for operating the user device and may facilitate communications and commands between applications executing on the architecture 300 and various hardware thereof. A transfer application 324 may be configured to receive images, audio, and/or video from another device (e.g., a mobile device, image capture device, and/or display device) or from an image sensor 332 and/or microphone 370 included in the architecture 300. In some examples, the transfer application 324 may also be configured to send the received voice commands to a natural language processing system 220.

In some examples, storage element 302 may include an AEC component 326. The AEC may be effective to attenuate echo from a downlink playback of audio by local device 102 (e.g., AEC may attenuate echo of playback 110 depicted in FIG. 1). In some further examples, storage element 302 may include an AEC Statistics Engine 390. The AEC Statistics Engine 390 may determine the AEC statistics of the AEC component 326 (such as Vss) and may determine, based on the characteristics of the AEC statistics, whether to perform one or more actions, such as whether to set a wake-word decision flag to a first state (e.g., "accept" (wherein a detected wake-word may be effective to "wake up" local device 102—causing local device 102 to pause/attenuate playback and to listen for further audio commands)) or a second state (e.g., "reject" (wherein a detected wake-word may be suppressed and playback may not be interrupted)).

When implemented in some user devices, the architecture 300 may also comprise a display component 306. The display component 306 may comprise one or more light-emitting diodes (LEDs) or other suitable display lamps. Also, in some examples, the display component 306 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 300 may also include one or more input devices 308 operable to receive inputs from a user. The input devices 308 can include, for example, a push button, touch pad, touch screen, wheel, joystick, keyboard, mouse, trackball, keypad, light gun, game controller, or any other such device or element whereby a user can provide inputs to the architecture 300. These input devices 308 may be incorporated into the architecture 300 or operably coupled to the architecture 300 via wired or wireless interface. In some examples, architecture 300 may include a microphone 370 or an array of microphones for capturing sounds, such as voice commands. Voice recognition engine 380 may interpret audio signals of sound captured by microphone 370. In some examples, voice recognition engine 380 may listen for a "wake-word" to be received by microphone 370. Upon receipt of the wake-word, voice recognition engine 380 may stream audio to a voice recognition server for analysis, as described above in reference to FIGS. 1 and 2. In various examples, voice recognition engine 380 may stream audio to external computing devices via communication interface 312.

When the display component 306 includes a touch-sensitive display, the input devices 308 can include a touch sensor that operates in conjunction with the display component 306 to permit users to interact with the image displayed by the display component 306 using touch inputs (e.g., with a finger or stylus). The architecture 300 may also include a power supply 314, such as a wired alternating current (AC) converter, a rechargeable battery operable to be recharged through conventional plug-in approaches, or through other approaches such as capacitive or inductive charging.

The communication interface 312 may comprise one or more wired or wireless components operable to communicate with one or more other user devices. For example, the communication interface 312 may comprise a wireless communication module 336 configured to communicate on a network, such as the network 104, according to any suitable wireless protocol, such as IEEE 802.11 or another suitable wireless local area network (WLAN) protocol. A short range interface 334 may be configured to communicate using one or more short range wireless protocols such as, for example, near field communications (NFC), Bluetooth, Bluetooth LE, etc. A mobile interface 340 may be configured to communicate utilizing a cellular or other mobile protocol. A Global Positioning System (GPS) interface 338 may be in communication with one or more earth-orbiting satellites or other suitable position-determining systems to identify a position of the architecture 300. A wired communication module 342 may be configured to communicate according to the USB protocol or any other suitable protocol. In various examples where architecture 300 represents local device 102 (shown in FIG. 1), mobile interface 340 may allow local device 102 to communicate with one or more other computing devices. For example, local device 102 may receive a command from a user device, an application of a user device, or a voice recognition server to perform an action.

The architecture 300 may also include one or more sensors 330 such as, for example, one or more position sensors, image sensors, and/or motion sensors. An image sensor 332 is shown in FIG. 3. Some examples of the architecture 300 may include multiple image sensors 332. For example, a panoramic camera system may comprise multiple image sensors 332 resulting in multiple images and/or video frames that may be stitched and may be blended to form a seamless panoramic output. An example of an image sensor 332 may be a camera configured to capture color information, image geometry information, and/or ambient light information.

Motion sensors may include any sensors that sense motion of the architecture including, for example, gyro sensors 344 and accelerometers 346. Motion sensors, in some examples, may be used to determine an orientation, such as a pitch angle and/or a roll angle, of local device 102. The gyro sensor 344 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 346 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 338 may be utilized as a motion sensor. For example, changes in the position of the architecture 300, as determined by the GPS interface 338, may indicate the motion of the GPS interface 338. Infrared sensor 360 may be effective to determine a distance between a surface and the device including the infrared sensor 360. In some examples, the infrared sensor 360 may determine the contours of the surface and may be capable of using computer vision techniques to recognize facial patterns or other markers within the field of view of the infrared sensor 360's camera. In some examples, the infrared sensor 360 may include an infrared projector and camera. Processing element 304 may build a depth map based on detection by the infrared camera of a pattern of structured light displayed on a surface by the infrared projector. In some other examples, the infrared sensor 360 may include a time of flight camera that may compute distance based on the speed of light by measuring the time of flight of a light signal between a camera of the infrared sensor 360 and a surface. Further, in some examples, processing element 304 may be effective to determine the location of various objects in the physical environment within the field of view of local device 102 based on the depth map created by the infrared sensor 360. As noted above, in some examples, non-infrared depth sensors, such as passive stereo camera pairs, or non-identical camera pairs, may be used in local device 102 in place of, or in addition to, infrared sensor 360. Processing element 304 may be effective to determine the location of various objects in the physical environment within the field of view of a camera of architecture 300 based on the depth map created by one or more non-infrared depth sensors.

Figure 4A:
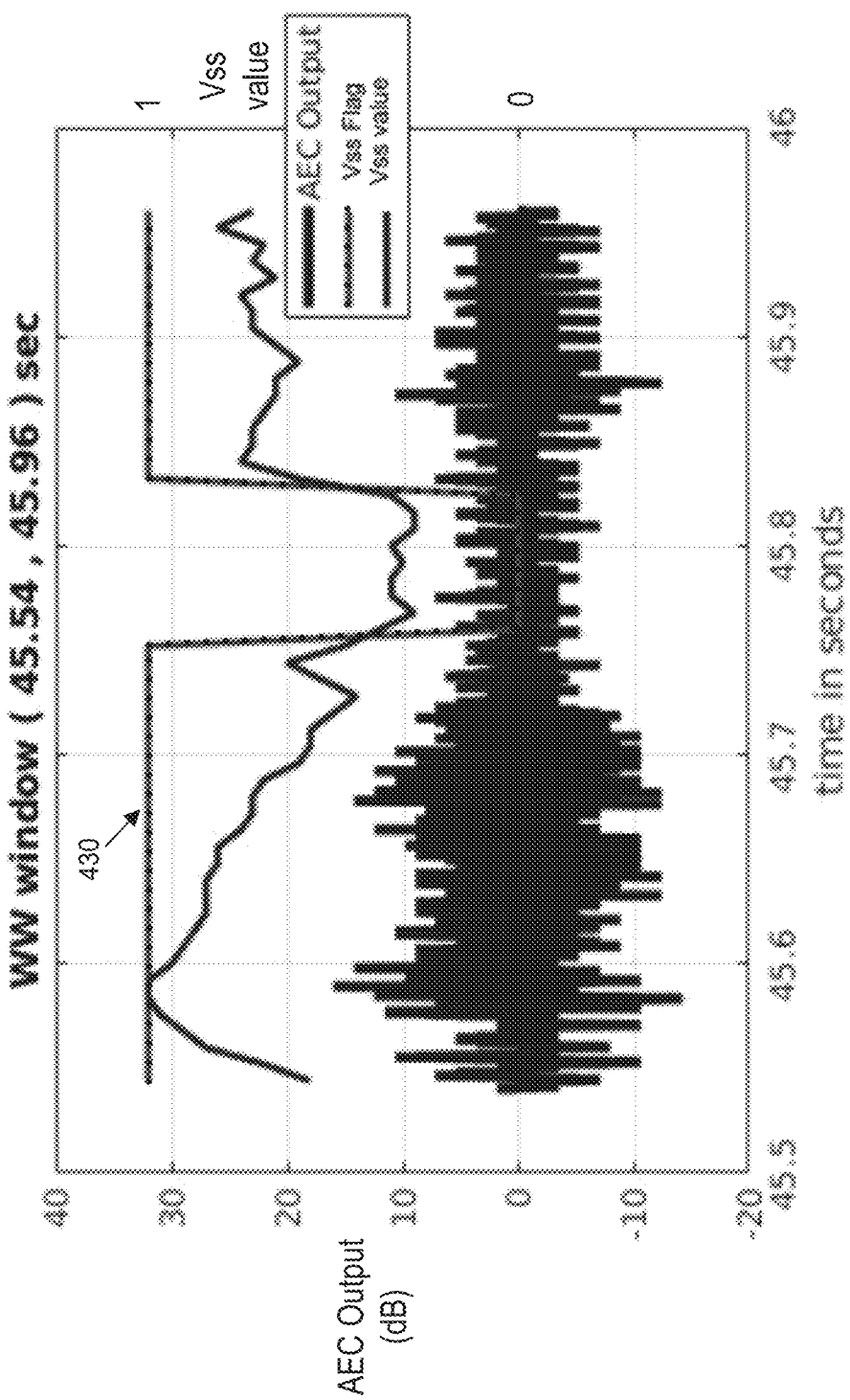
FIGS. 4A-4B illustrate three examples of wake-word detection windows showing AEC output, variable step size values, and variable step size decision flags, in accordance with various aspects of the present disclosure.
Figure 4B:
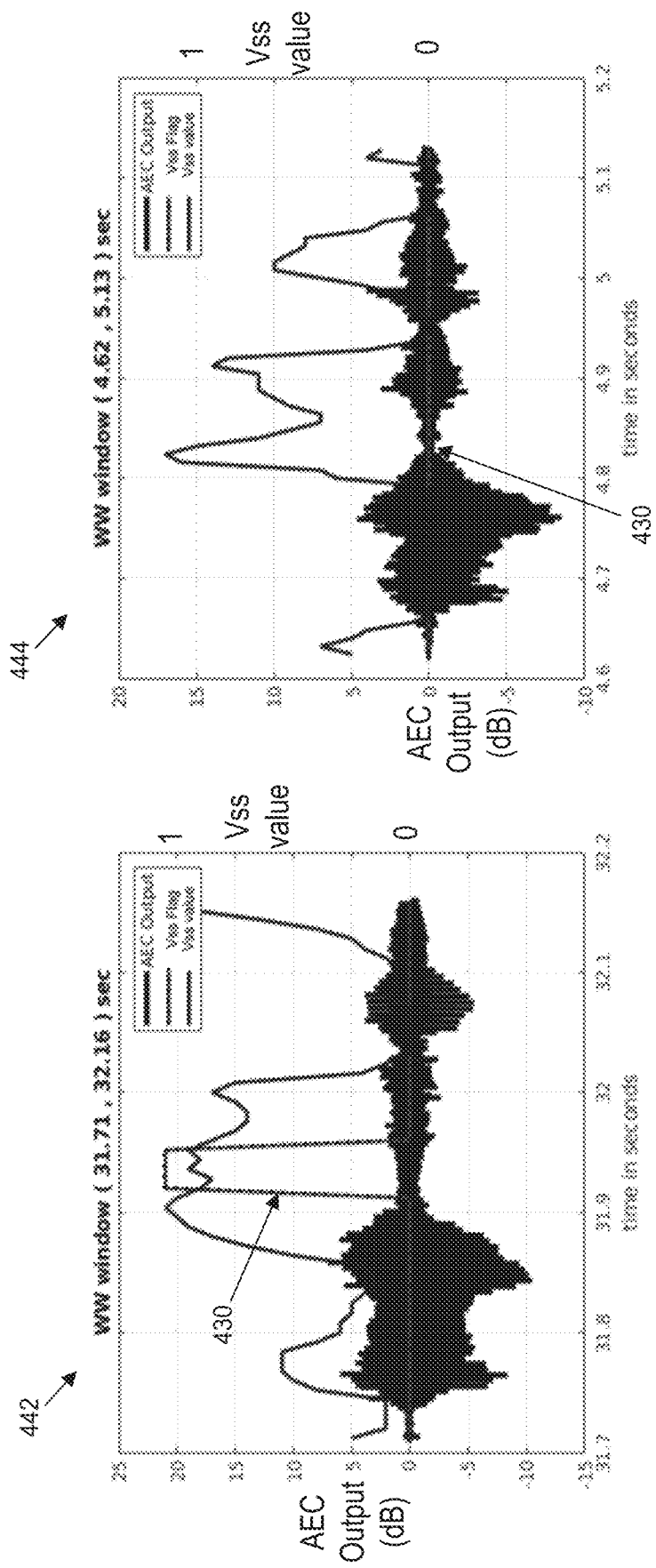

FIGS. 4A-4B illustrate three examples of wake-word detection windows showing AEC output, variable step size values, and variable step size decision flags, in accordance with various aspects of the present disclosure. Those components of FIGS. 1-3 that have been described above may not be described again herein for purposes of brevity and clarity. The wake-word window ("WW window") depicted in FIG. 4A represents a portion of audio (e.g., audio captured over a time period) during which a wake-word was detected. The y-axis in FIGS. 4A-4B may be representative of the Vss values. However, these values are merely illustrative and may not be accurate representations of actual Vss values that may be determined by AEC during processing of live audio. In the examples depicted in FIGS. 4A-4B the magnitude of the AEC values shown may be larger than actual AEC values, for illustrative purposes.

In FIG. 4A, the Vss value remains above 0.5 for the majority of the time period corresponding to the detected wake-word. This may indicate that there is a relatively high cross correlation between the AEC output and the reference signal of the downlink audio. While the Vss value remains relatively high (e.g., above a tunable threshold Vss value) and/or while the rate of decline of the Vss value is less than a threshold rate. The Vss decision flag 430 may be set to a high value (e.g., 1 or any suitable value). Conversely, from about 45.76 s-45.82 s, the Vss decision flag 430 may be set to a low value (e.g., 0 or another suitable value). This may be due to the decline in the Vss value during this time (e.g., decreasing below a threshold value of 0.5) and/or the rate of decline of the the Vss values during this time period exceeding a threshold rate. In various examples, rate of decline and/or increase of Vss values over a given time period may be determined by fitting a trend line to the Vss values over the time period and determining if the slope of the trend line is greater than, less than, or equal to relevant threshold rates. The low Vss value and/or the decline in Vss values may indicate that there is less of a cross-correlation between the AEC output and the reference signal of the downlink audio, possibly indicating near-end speech, noise, or other sounds that have no corresponding portion in the downlink reference signal. The ratio of the amount of time (for the wake-word detection window) that the Vss decision flag 430 is high to the amount of time that the Vss decision flag 430 is low (or to the total wake-word detection window) may be determined. In some cases, this may be referred to as determining an overlap (e.g., a percentage of the time that the flag is either high or low relative to the total time period of the wake-word detection window). This ratio and/or overlap percentage may be used to determine whether to supress the detected wake-word (e.g., as being present in the downlink audio as opposed to being representative of user speech) or not. The Vss decision flag 430 represents a decision state (determined using Vss values) for a given time period.

For example, if the Vss decision flag 430 is ON (e.g., high) for more than 60% (or any other suitable value) of the total time period of the wake-word detection window, the wake-word may be suppressed. Suppression of the wake-word may result in further audio detected by the microphone being discarded (e.g., not persisted in memory) and may cause the current audio playback not to be attenuated or paused. Conversely, if the Vss decision flag 430 is OFF (e.g., low) for the more than 60% (or any other suitable value) of the total time period of the wake-word detection window, the wake-word may be deemed user speech. Playback may be attenuated and/or paused and subsequent audio captured by the microphone may be recorded and/or stored for further processing (e.g., to detect and act on a user's spoken request). It should be appreciated that the particular implementation details (e.g., a high Vss decision flag 430 corresponding to suppression and a low Vss decision flag 430 corresponding to acceptance of a wake-word) may be switched, as desired. Additionally, the particular overlap threshold may be tuned according to the desired implementation and/or sensitivity. Further, determining a ratio of a high Vss decision flag or low Vss decision flag relative to the total wake-word detection time window or determining the ratio of a low-to-high decision flag or a high-to-low decision flag may vary according to the desired implementation. In general, higher and/or rapidly increasing Vss values may be indicative that a wake-word is present in the downlink audio and should be suppressed, while lower and/or rapidly decreasing Vss values may be indicative that a wake-word is the result of near-end audio (e.g., user speech) detected by the microphone.

In the wake-word detection window 442 of FIG. 4B, the Vss values are relatively low (e.g., below 0.4) for the majority of the wake-word detection window 442. Accordingly, the Vss decision flag 430 remains low for the majority of the wake-word detection window 442. However, at approximately 31.85 s, the Vss values begin to rapidly increase. Accordingly, the Vss decision flag 430 switches from low to high (e.g., due to the Vss values exceeding a Vss value threshold and/or due to a rate of increase of the Vss values exceeding a threshold rate of increase). However, from about 31.90 s to 31.98 s the Vss values begin to trend downward. Accordingly, the Vss decision flag 430 transitions from high to low (e.g., due to the Vss values falling below a Vss value threshold and/or due to a rate of decrease of the Vss values exceeding a threshold rate of decrease). In the example wake-word detection window 442 the Vss decision flag 430 is low for a majority of the time (due to relatively low and/or decreasing Vss values over the period of wake-word detection). For example, the Vss decision flag may be low for 80% of the wake-word detection window 442. As such, the wake-word may be deemed to be the result of near-end audio detected by the microphone and the wake-word may be accepted. As such, audio playback may be paused and/or attenuated and audio may be recorded for speech processing and/or for transmission to one or more remote computing devices for speech processing.

Similarly, in the wake-word detection window 444 of FIG. 4B, the Vss values are relatively low (e.g., below 0.5) for the entire wake-word detection window 444. Accordingly, the Vss decision flag 430 remains low for the entire wake-word detection window 444. Although the Vss values begin to rapidly increase at approximately 4.79 s the Vss values never reach 0.5 (which may be a threshold Vss value in this example). Accordingly, the Vss decision flag 430 does not transition from low to high during the wake-word detection window 444. Since the Vss decision flag 430 is low for 100% of the wake-word detection window 444 (or, stated another way, the ratio of a high Vss decision flag to a low Vss decision flag is 0%), the wake-word may be deemed to be the result of near-end audio detected by the microphone and the wake-word may be accepted. As such, audio playback may be paused and/or attenuated and audio may be recorded for speech processing and/or for transmission to one or more remote computing devices for speech processing.

As previously described, Vss values are not volume dependent and thus may be a highly-scalable metric that may be used to distinguish between valid wake-words (e.g., user-spoken wake-words) and non-valid wake-words (e.g., wake-words detected in downlink audio) since there is no need to tune the Vss-based wake-word suppression techniques for different volume levels. Similarly, Vss-based wake-word detection does not depend on non-linearities of loudspeaker playback and thus does not need to be re-turned for different types of loudspeakers. Accordingly, the various Vss-based wake-word suppression systems and techniques described herein may be advantageous over other AEC-based wake-word suppression systems.

Figure 5A:
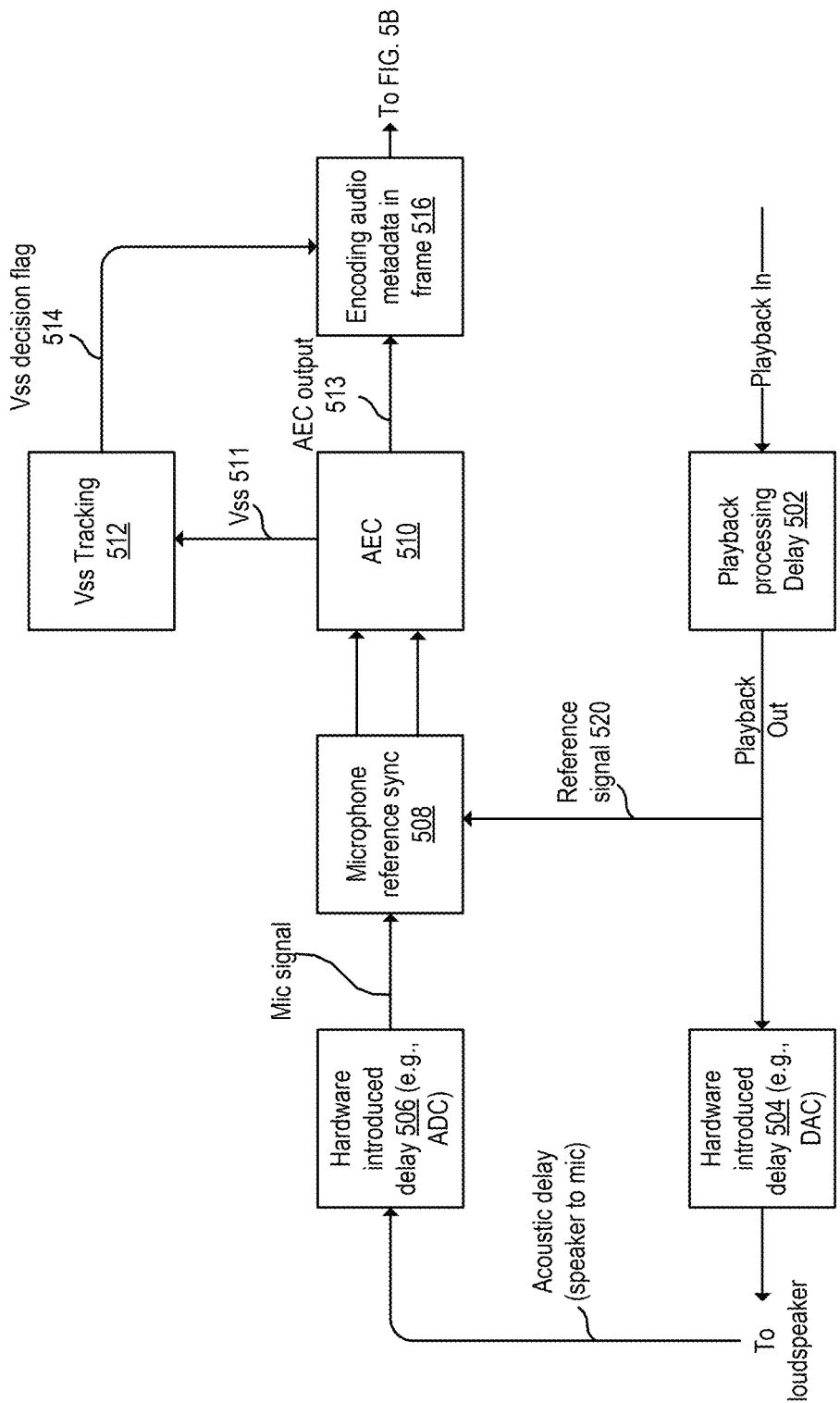
FIGS. 5A-5B depict a block diagram of a variable step size-based wake-word suppression system, in accordance with various aspects of the present disclosure.
Figure 5B:
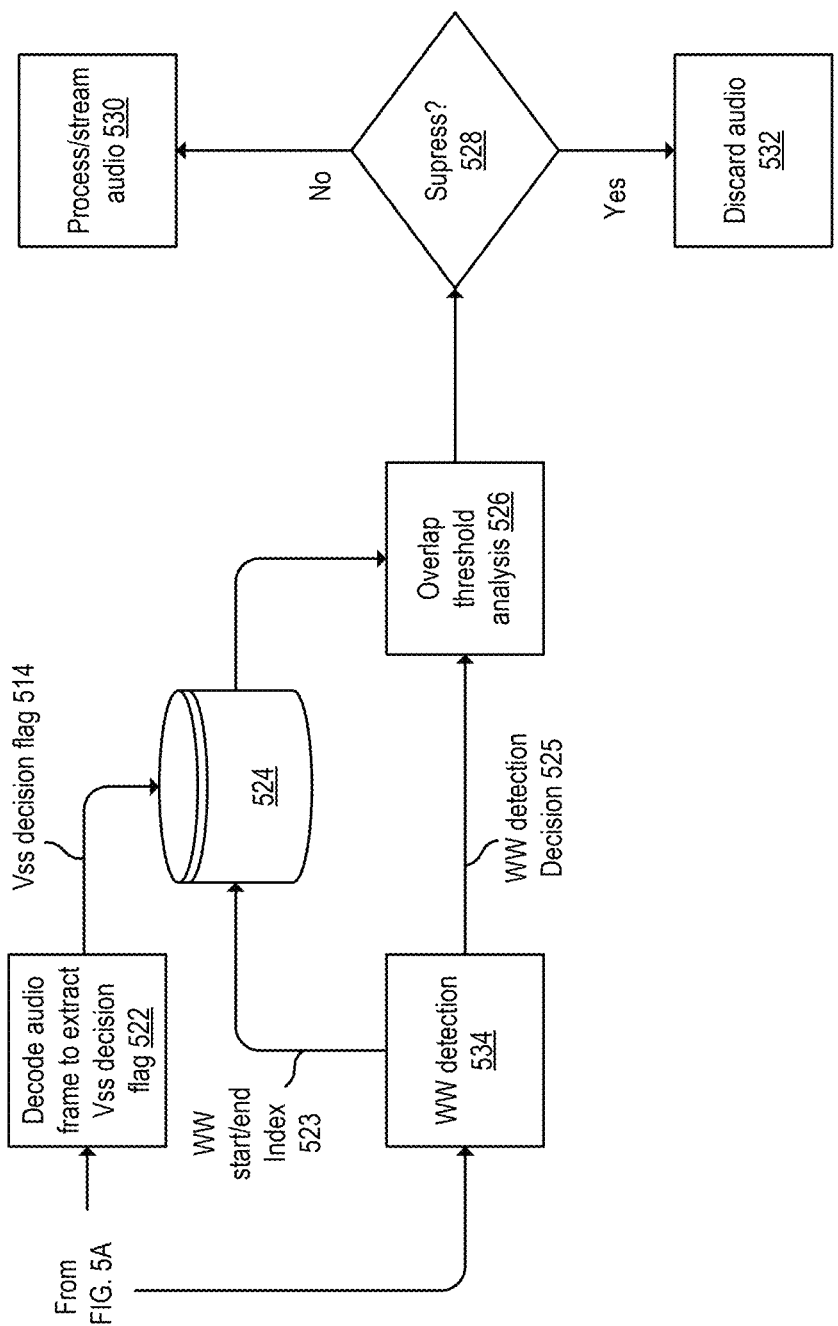

FIGS. 5A-5B depict a block diagram of a variable step size-based wake-word suppression system, in accordance with various aspects of the present disclosure. FIG. 5A depicts front end audio processing where a downlink signal is received, played back via a loudspeaker, and audio is detected from the acoustic environment by a microphone. Downlink audio may be received (e.g., streamed from a cloud-based streaming service and/or from some other audio data source) and received as "Playback In." Playback processing delay 502 may result from processing the downlink audio (e.g., transcoding and/or other audio processing). The playback out may be split with one digital audio signal being sent to audio processing hardware (e.g., a digital to analog (DAC) converter (which may introduce hardware introduced delay 504)) and one digital audio signal being used as a reference signal 520 for the downlink audio. In various examples, the reference signal 520 (and/or the audio signal output by the loudspeaker) may be equalized prior to ouput.

After conversion to an analog signal, the audio may be output by the loudspeaker. Acoustic delay may result from the time between when the audio is output by the loudspeaker to the time at which the audio is detected by the microphone. This delay depends on the particular acoustic environment in which the microphone and the loudspeaker are situated. Upon receipt of the analog audio signal by the microphone, an analog-to-digital (ADC) converter may be used to generate a digital representation of the signal received by the microphone (introducing further hardware introduced delay 506). At block 508 the microphone signal (delayed by hardware introduced delay 504, the acoustic delay, and the hardware introduced delay 506) may be synchronized with the reference signal 520. The synchronized microphone signal and reference signal 520 may be sent to AEC 510. As previously-described, AEC 510 may continuously adapt the FIR filter of the AEC 510 (to determine the transfer function of the acoustic path between the loudspeaker and the microphone). The adaptive filter may be used to attenuate echo and generate the AEC output 513. Cross-correlation between the reference signal 520 and the AEC output 513 may be used to determine a correlation value measuring the difference/similarity of the reference signal 520 and the AEC output 513. The correlation value may be used to determine the Vss values 511. Vss values 511 may be tracked over time using a Vss tracking block 512.

The Vss tracking block 512 may include logic related to determining whether the Vss decision flag (e.g., Vss decision flag 514) is high or low at a given time. As previously described, the Vss decision flag 514 may be set high when the Vss values 511 are increasing and/or are at or above a particular high threshold Vss value. In some examples, the rate of increase and the Vss high threshold value may be used to determine whether to set the Vss decision flag 514 high. The particular Vss high threshold and/or rate of increase threshold may vary from implementation to implementation. Similarly, the Vss decision flag 514 may be set to low when the Vss values 511 are decreasing and/or are at or below a particular low threshold Vss value. In some examples, the rate of decrease and the Vss low threshold value may be used to determine whether to set the Vss decision flag 514 low. The particular Vss low threshold and/or rate of decrease threshold may vary from implementation to implementation. The Vss decision flag 514 may be an indicator bit (or bits) used to distinguish between a high and low Vss decision flag 514.

The Vss decision flag 514 may be encoded in audio metadata (e.g., into a least significant bit of a frame of audio data) at block 516. Advantageously, encoding the Vss decision flag 514 as audio metadata maintains the synchronization between the audio signal and the time-corresponding Vss decision flags 514 without requiring any additional synchronization techniques. Processing may continue at FIG. 5B when the encoded audio (including the Vss decision flag 514) is sent to a wake-word detection component (e.g., wake-word detection component 221 of FIG. 2). The wake-word detection component represented by FIG. 5B may be located on the same device as the microphone and/or on a remote device, depending on the implementation. Each received audio frame may be decoded to extract the Vss decision flag 514 (e.g., Vss decision data extracted at block 522) which may be stored in a database 524 along with the relevant time stamp data. Additionally, the received audio frames may be sent to a wake-word detection 534 that may be used to detect any wake-words represented in the received audio frames.

In various examples, wake-word detection 534 may compare audio data to stored models or data to detect a wake-word. One approach for wake-word detection applies general large vocabulary continuous speech recognition (LVCSR) systems to decode audio signals, with wake-word searching being conducted in the resulting lattices or confusion networks. LVCSR decoding may require relatively high computational resources. Another approach for wake-word spotting builds HMMs for each wake-word and non-wake-word speech signals, respectively. The non-wake-word speech includes other spoken words, background noise, etc. There can be one or more HMMs built to model the non-wake-word speech characteristics, which are named filler models. Viterbi decoding is used to search the best path in the decoding graph, and the decoding output is further processed to make the decision on wake-word presence. This approach can be extended to include discriminative information by incorporating a hybrid DNN-HMM decoding framework. In another example, the wake-word detection component 221 may be built on deep neural network (DNN)/recursive neural network (RNN) structures directly, without HMM being involved. Such an architecture may estimate the posteriors of wake-words with context information, either by stacking frames within a context window for DNN, or using RNN. Follow-on posterior threshold tuning or smoothing is applied for decision making. Other techniques for wake-word detection, such as those known in the art, may also be used.

Wake-word detection 534 may generate a wake-word (WW) detection decision 525 indicating, for a given frame or frames, whether a wake-word has been detected. Upon detection of a wake-word during a given time frame of audio, the timestamp data indicating the starting and ending time period of the wake-word in the audio (e.g., WW start/end index 523) may be used to query the database 524 to determine the Vss decision flags 514 that correspond to the wake-word detection window. The Vss decision flags 514 may be sent to overlap threshold analysis block 526. Overlap threshold analysis block 526 may determine the ratio of high Vss decision flags 514 to low Vss decision flags 514 over the wake-word detection window. At block 528 a decision may be made, based on the ratio (e.g., the percentage of overlap) whether to suppress the detected wake-word or not. For example, the ratio/overlap may be compared to a threshold ratio/overlap. For example, if the Vss decision flag 514 is high for greater than 60%, 62%, 78% (or any other desired overlap/ratio threshold) a decision may be made at block 528 to suppress the detected wake-word. Processing may then continue at block 532 and subsequent audio may be discarded, ignored, and/or overwritten. Additionally, playback may continue without attenuation and/or interruption since the detected wake-word has been determined to be in the downlink audio. Conversely, if the Vss decision flag 514 is low for greater than 55%, 60%, 78%, 81% (or any other desired overlap/ratio threshold) a decision may be made at block 528 not to suppress the detected wake-word. Processing may continue to block 530 at which playback may be paused and/or attenuated, indicator lights and/or graphics may be turned on, an indicator sound may play, and subsequently uttered audio may be captured so that user commands may be processed. For example, after determining that the detected wake-word was a user-uttered wake-word using the various techniques described herein, music playback may be attenuated, a light may turn on on the relevant device (to indicate that a speech processing function of the device has been activied) and TTS may be used to output virtual assistant audio such as "Yes, how may I assist you?" Subsequent audio may be recorded and processed to determine the user's intent.

The example equations below may be used to set the Vss flag. However, the logic below is merely an example of one possible implementation. Other techniques may be used to set the Vss flag, according to the desired implementation. In the example implementation below, Equation (3) may be replaced by an expression for Vss (e.g., AEC adaptive filter convergence rate to the changing downlink audio and/or changing acoustic conditions).

$$P_{mic,avg}[n] = (1-\alpha_p) \cdot |d[n]|^2 + \alpha_p \cdot P_{mic,avg}[n-1] \quad (1)$$

Eq.(1): Smoothed microphone power computation. Typical smoothing values α for calculating microphone "d[n]" average power may be 0.98 and may be provided by a leaky-integrator.

$$P_{AECout,avg}[n]=(1-\alpha_p)\cdot|e[n]|^2+\alpha_p\cdot P_{AECout,avg}[n-1] \quad (2)$$

Eq.(2): Smoothed AEC output power computation. Typical smoothing values for calculating AEC output "e[n]" average power may be 0.98 and may be provided by a leaky-integrator.

$$x_1[n] \triangleq 10 \cdot \log_{10}\left(\frac{P_{mic,avg}[n]}{P_{AECout,avg}[n]}\right) \quad (3)$$

Eq.(3): Definition of Echo-Return-Loss-Enhancement (ERLE).

$$x_2[n]=(1-\alpha_{FAST})\cdot x_1[n]+\alpha_{FAST}\cdot x_2[n-1] \quad (4)$$

$$x_3[n]=(1-\alpha_{SLOW})\cdot x_1[n]+\alpha_{SLOW}\cdot x_3[n-1] \quad (5)$$

Eqs.(4,5): Fast and Slow smoothing of the ERLE metric. Typical time-constants for fast and slow smoothing may be 0.900 and 0.995, respectively.

$$x_4[n]=(1-\alpha_{SLOW})\cdot|x_1[n]|^2+\alpha_{SLOW}\cdot x_4[n-1] \quad (6)$$

$$x_5[n]=x_4[n]-|x_3[n]|^2 \quad (7)$$

Eqs.(6,7): Second statistical moment and variance computation of the ERLE metric respectively.

$$x_6[n]=x_2[n]-x_3[n] \quad (8)$$

Eq.(8): Subtraction in order to remove bias and emphasize on trend of the ERLE metric (upwards or downwards).

$$x_7[n] = \begin{cases} 1, (x_6[n] > THR1) \text{ OR } (x_5[n] < VARTHR \text{ AND } x_3[n] > THR2) \\ 0, \text{else} \end{cases} \quad (9)$$

Eq.(9): If a positive trend that exceeds a threshold "THR1" is detected OR if the ERLE exhibits a high value (determined by "THR2") and is converged (small variance threshold determined by "VARTHR") then output "1". Otherwise output "0". Typical value for "THR1" may be zero or about 10^(−10) to avoid potential numerical issues. Typical values for "THR2" and "VARTHR" may be 15 dB and 0.6 respectively.

$$x_8[n] = \begin{cases} x_7[n], x_7[n] > 0 \\ \alpha_{hold} \cdot x_8[n-1], \text{else} \end{cases} \quad (10)$$

$$x_9[n] = \begin{cases} 1, x_8[n] > HOLD\_THRESH \\ 0, \text{else} \end{cases} \quad (11)$$

$$\text{where: } \alpha_{hold} = 10^{\frac{\log_{10}(HOLD_{THRESH})}{\tau\cdot F_s}} \quad (12)$$

$$F_s = \frac{16000}{128} = 125 \text{ samples/sec} \quad (13)$$

Eq.(13): Example definition of sampling rate.

Eqs. (10, 11, 12): Apply additional hold-time on the wake-word accept/reject flag generated by Eq.(9) (if needed) in order to align the wake-word detection timing. If the output of Eq.(9) is positive then pass the signal as is (instantaneous attack time). Otherwise, if the output of Eq.(9) is negative apply exponential decay. The exponentially decayed function is now subjected to a new threshold in order to increase the hold-time (amount of time that the wake-word accept/reject flag remains "true" after a negative-edge was detected) by T. For example, if a pulse produced by Eq.(9) exhibits a negative edge at t0=1 sec the positive duration my be extended by another 0.2 seconds. Accordingly, Eq.(12) may be computed as follows: (assume HOLD$_{THRESH}$=0.1). Eq.(12): $\alpha_{hold}$=10^(log 10(0.1)/(125*0.2))=>$\alpha_{hold}$=0.9120

$$x_{10}[n] = \begin{cases} x_9[n], x_1[n] \geq ERLE\_THRESH \\ 0, \text{else} \end{cases} \quad (14)$$

τ=specified hold time in seconds for a given HOLD_THRESH exponential threshold

Eq.(14): If the ERLE (defined by Eq.(3)) drops below a threshold "ERLE THRESH" the decision made in Eq. (11) may be bypassed. The flag wake-word accept/reject flag may be equal to zero otherwise pass the flag as is. This condition is introduced to ensure that a false rejection rate does not degrade when a near-end user tries to activate the device. When a near-end user issues a command, the ERLE is expected to drop abruptly since this corresponds to a DT condition. In the above equations, α refers to a time-constant for fast or slow smoothing of the ERLE metric. P(n) refers to power, x(n) refers to an input signal, $F_s$ and is a sampling frequency.

Figure 6:
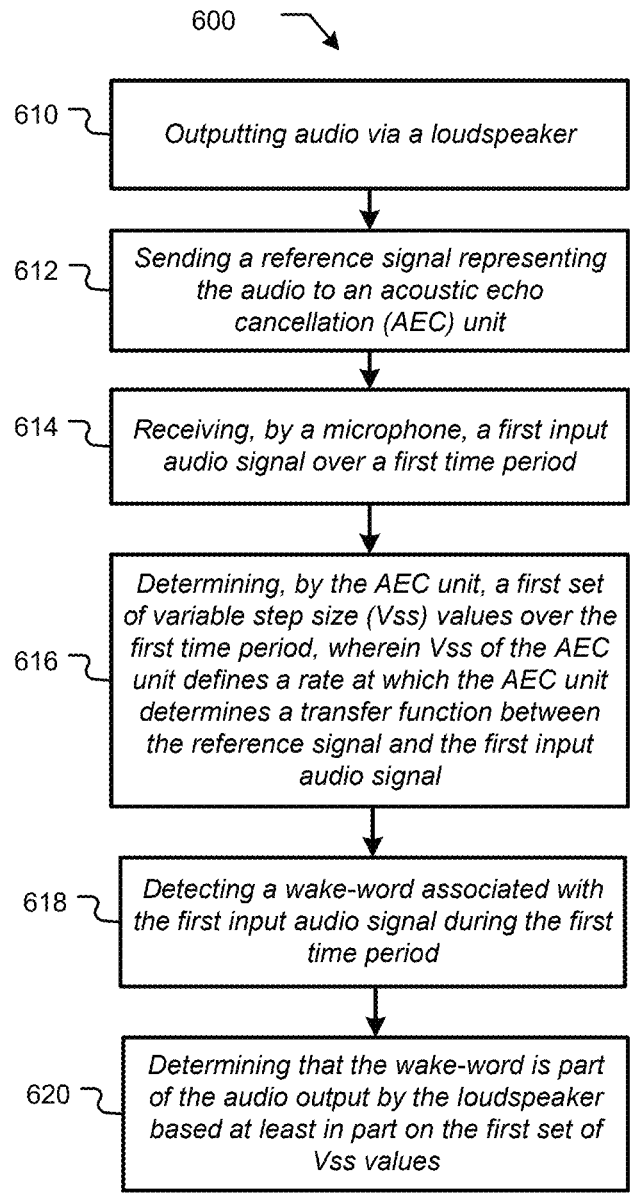
FIG. 6 depicts a flow chart showing an example process for voice-controlled device control using variable step size of an acoustic echo cancellation unit, in accordance with various aspects of the present disclosure.

In the example implementation algorithm above, the proposed use of the "ERLE_FLAG" (e.g., the wake-word accept/reject flag) of Eq.(14) is:

IF WAKE-WORD==DETECTED AND ERLE_FLAG=TRUE (for more than 50% of the time interval [wwEndTime−0.5*(wwEndTime−wwStartTime), wwEndTime]) THEN IGNORE WAKE-WORD
ELSE IF WAKE-WORD==DETECTED AND ERLE_FLAG=FALSE (for more than 50% of the time interval [wwEndTime−0.5*(wwEndTime−wwStartTime), wwEndTime]) THEN ACCEPT WAKE-WORD FIG. 6 depicts a flow chart showing an example process 600 for voice-controlled device control using variable step size of an acoustic echo cancellation unit, in accordance with various aspects of the present disclosure. The process 600 of FIG. 6 may be executed by local device 102 and/or by a combination of local device 102 and a computing device configured to be in communication with local device 102, in accordance with various aspects of the present disclosure. The actions of process 600 may represent a series of instructions comprising computer-readable machine code executable by a processing unit of a computing device or of local device 102. In various examples, the computer-readable machine code may be comprised of instructions selected from a native instruction set of the computing device and/or an operating system of the computing device.

Various actions in process 600 may be described with reference to elements of FIGS. 1-5B.

Processing may begin at action 610, at which audio may be output via a loudspeaker. The audio may be streamed from a different service (e.g., a music service, a voice over IP service, etc.). Processing may continue at action 612, at which a reference signal representing the audio may be sent to an acoustic echo cancellation (AEC) unit. As described herein, the AEC unit may be configured to determine the transfer function between the loudspeaker, the acoustic environment, and a microphone. The AEC unit may cancel echo caused by the output of the loudspeaker.

Processing may continue at action 614, at which a microphone may receive a first input audio signal over a first time period. For example, a microphone may detect audio resulting from the audio output by the loudspeaker as well as any other audio detected in the near end (e.g., user speech, ambient noise, echo, etc.). Processing may continue at action 616, at which the AEC unit may determine a first set of Vss values over the first time period. The Vss may define a rate at which the AEC unit determines a transfer function between the reference signal and the first input audio signal (e.g., by modeling the acoustic environment). As previously described, the Vss values (e.g., the rate at which the adaptive FIR filter of the AEC unit converges) may be modified based on a cross correlation between the AEC output and the reference signal.

Processing may continue at action 618, at which a wake-word associated with the first input audio signal (e.g., the signal detected by the microphone) may be detected during the first time period. The wake-word may be present in the downlink audio (e.g., in streamed audio data being output by the loudspeaker) or may be the result of a user or other source stating the wake-word.

Processing may continue at action 620, at which a determination may be made that the wake-word is part of the audio output by the loudspeaker based at least in part on the first set of Vss values. For example, the Vss decision flags for the wake-word detection window may be determined. Thereafter, the ratio of the Vss decision flag being high to low (or the ratio of the Vss decision flag being high to the total time period of the wake-word detection window, etc.) may be determined. In the current example, the ratio of the Vss decision flag being high to low (or being high relative to the total time period) may be above a threshold ratio. Accordingly, it may be determined that the wake-word is present in the downlink audio (e.g., the audio output by the loudspeaker). As a result, the wake-word may be ignored. Playback may continue without pausing/attenuation, and any captured audio may be discarded. Conversely, if the ratio is below the threshold ratio (e.g., the percentage of time that the Vss decision flag is high relative to either the percentage of time that the Vss decision flag is low or to the total time of the wake-word detection period), the wake-word may be deemed to be part of user speech. Playback may be paused/attenuated and subsequent audio may be recorded and/or transmitted for speech processing.

Among other potential benefits, a system in accordance with the present disclosure may allow an automatic speech recognition system to distinguish between sources of different signals. For example, a system in accordance with the present disclosure may distinguish between a user-spoken wake-word and a wake-word that is present in the downlink playback stream without using a computationally expensive second wake-word engine to detect wake-words directly in the playback stream (e.g., the downlink audio stream). Determining that a wake-word has occurred in the playback stream can be used to prevent an interruption in the playback and thus may avoid user inconvenience.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method to distinguish between a user-spoken wake-word and a wake-word present in playback by a voice-controlled computing device, the method comprising:
   outputting audio via a loudspeaker of the voice-controlled computing device;
   generating, by the voice-controlled computing device, a reference signal, wherein the reference signal comprises an equalized signal representative of the audio;
   sending, by the voice-controlled computing device, the reference signal to an acoustic echo cancellation (AEC) unit;
   detecting, by the voice-controlled computing device, an input signal, wherein the input signal corresponds to an echo of audio output by the loudspeaker, the input signal being generated by a microphone and an analog to digital converter of the voice-controlled computing device;
   sending, by the voice-controlled computing device, the input signal to the AEC unit;
   generating, by the AEC unit, an output signal by attenuating at least a first portion of the input signal;
   determining, by the AEC unit over a first period of time, a first set of variable step size (Vss) values, the first set of Vss values corresponding to a rate at which the AEC unit adapts to the input signal and the reference signal;
   determining, by a wake-word engine, a presence of a wake-word in the input signal during the first period of time;
   determining that the wake-word is present in the audio output by the loudspeaker by determining a trend associated with the first set of Vss values; and
   continuing to output the audio without pausing or attenuating the audio in response to the determining the presence of the wake-word.

2. The method of claim 1, further comprising:
   determining, by the voice-controlled computing device, a decline from a first Vss value to a second Vss value during a second period of time following the first period of time, wherein the second Vss value is less than the first Vss value;
   determining, by the wake-word engine, presence of the wake-word in the input signal during the second period of time; and
   attenuating the playback of the audio based at least in part on the decline from the first Vss value to the second Vss value during the second period of time.

3. The method of claim 2, further comprising:
   determining, during the second period of time, a first amount of time during which a Vss flag is set to a first state;
   determining, during the second period of time, a second amount of time during which the Vss flag is set to a second state;
   determining a ratio of the first amount of time to the second amount of time; and
   determining that the ratio exceeds a threshold ratio, wherein the attenuating the playback of the audio is further based at least in part on the ratio exceeding the threshold ratio.

4. A method, comprising:
   outputting audio via a loudspeaker;
   sending a reference signal representing the audio to an acoustic echo cancellation (AEC) unit of a computing device;
   receiving, by a microphone of the computing device, a first input audio signal over a first time period;
   determining a first set of variable step size (Vss) values of the AEC unit over the first time period;
   determining, based on the first input audio signal, a wake-word during the first time period; and
   determining that the wake-word is part of audio output by the loudspeaker based on a determination of a trend associated with the first set of Vss values.

5. The method of claim 4, further comprising:
   receiving, by the microphone, a second input audio signal over a second time period;
   determining, by the AEC unit, a second Vss value during the second time period, wherein the second Vss value is lower than any Vss value of the first set of Vss values;
   detecting, based on the second input audio signal, the wake-word during the second time period; and
   determining, based at least in part on the second Vss value, that the wake-word is not present in the audio output by the loudspeaker.

6. The method of claim 4, further comprising:
   determining, over the first time period, a first amount of time during which first Vss values of the first set of Vss values are above a threshold value;
   determining, over the first time period, a second amount of time during which second Vss values of the first set of Vss values are below the threshold value;
   determining, for the first time period, a ratio of the first amount of time to the second amount of time; and
   determining that the ratio is above a threshold ratio, wherein determining that the wake-word is part of the audio output by the loudspeaker is further based at least in part on the ratio being above the threshold ratio.

7. The method of claim 4, further comprising:
   generating, by the AEC unit, a first output signal by attenuating at least a first portion of the first input audio signal;
   determining, using cross correlation, a first correlation value between the first output signal and a first corresponding portion of the reference signal; and
   determining a first Vss value of the first set of Vss values based on the first correlation value.

8. The method of claim 7, further comprising:
   generating, by the AEC unit, a second output signal by attenuating at least a second portion of the first input audio signal over a second time period following the first time period;
   determining, using cross correlation, a second correlation value between the second output signal and a second corresponding portion of the reference signal, wherein the second correlation value is less than the first correlation value; and
   determining a second Vss value of the first set of Vss values based on the second correlation value, wherein the second Vss value is less than the first Vss value.

9. The method of claim 4, further comprising:
determining that a first Vss value of the first set of Vss values exceeds a threshold Vss value, wherein the determining that the wake-word is part of the audio output by the loudspeaker is further based at least in part on the first Vss value of the first set of Vss values exceeding the threshold Vss value; and
attenuating the audio output by the loudspeaker.

10. The method of claim 4, further comprising:
determining a second set of Vss values of the AEC unit over a second time period;
determining, over the second time period, a first amount of time during which first Vss values of the second set of Vss values are above a threshold value;
determining, over the second time period, a second amount of time during which second Vss values of the second set of Vss values are below the threshold value;
determining, for the second time period, a ratio of the first amount of time to the second amount of time;
determining that the ratio is below a threshold ratio;
determining that the wake-word is not present in the audio output based at least in part on the ratio being below the threshold ratio; and
attenuating the audio output by the loudspeaker.

11. The method of claim 4, further comprising:
determining the first set of Vss values of the AEC unit based at least in part on a correlation between an AEC output signal and the reference signal, wherein the Vss values correspond to a rate at which the AEC unit determines a transfer function between the reference signal and the first input audio signal.

12. The method of claim 4, further comprising:
determining Vss decision data at a plurality of times within the first time period, wherein, at each time, of the plurality of times, the Vss decision data comprises a first value or a second value; and
determining, using the Vss decision data, a first percentage of the first time period during which the Vss decision data has the first value,
wherein determining that the wake-word is part of the audio output by the loudspeaker is further based at least in part on the first percentage.

13. A system comprising:
at least one processor;
a loudspeaker;
a microphone; and
a non-transitory computer-readable memory configured in communication with the at least one processor, the memory effective to store instructions that when executed by the at least one processor are effective to:
output audio via the loudspeaker;
send a reference signal representing the audio to an acoustic echo cancellation (AEC) unit;
receive, by the microphone, a first input audio signal over a first time period;
determine a first set of variable step size (Vss) values of the AEC unit over the first time period;
determine, based on the first input audio signal, a wake-word during the first time period; and
determine that the wake-word is part of audio output by the loudspeaker based on a determination of a trend associated with the first set of Vss values.

14. The system of claim 13, the non-transitory computer-readable memory storing further instructions that, when executed by the at least one processor, are further effective to:
receive, by the microphone, a second input audio signal over a second time period;
determine, by the AEC unit, a second Vss value during the second time period, wherein the second Vss value is lower than any Vss value of the first set of Vss values;
detect, based on the second input audio signal, the wake-word during the second time period; and
determine, based at least in part on the second Vss value, that the wake-word is not present in the audio output by the loudspeaker.

15. The system of claim 13, the non-transitory computer-readable memory storing further instructions that, when executed by the at least one processor, are further effective to:
determine, over the first time period, a first amount of time during which first Vss values of the first set of Vss values are above a threshold value;
determine, over the first time period, a second amount of time during which second Vss values of the first set of Vss values are below the threshold value;
determine, for the first time period, a ratio of the first amount of time to the second amount of time; and
determine that the ratio is above a threshold ratio, wherein the determining that the wake-word is part of the audio output by the loudspeaker is further based at least in part on the ratio being above the threshold ratio.

16. The system of claim 13, the non-transitory computer-readable memory storing further instructions that, when executed by the at least one processor, are further effective to:
generate, by the AEC unit, a first output signal by attenuating at least a first portion of the first input audio signal;
determine, using cross correlation, a first correlation value between the first output signal and a first corresponding portion of the reference signal; and
determine a first Vss value of the first set of Vss values based on the first correlation value.

17. The system of claim 16, the non-transitory computer-readable memory storing further instructions that, when executed by the at least one processor, are further effective to:
generate, by the AEC unit, a second output signal by attenuating at least a second portion of the first input audio signal over a second time period following the first time period;
determine, using cross correlation, a second correlation value between the second output signal and a second corresponding portion of the reference signal, wherein the second correlation value is less than the first correlation value; and
determine a second Vss value of the first set of Vss values based on the second correlation value, wherein the second Vss value is less than the first Vss value.

18. The system of claim 13, the non-transitory computer-readable memory storing further instructions that, when executed by the at least one processor, are further effective to:
determine that a first Vss value of the first set of Vss values exceeds a threshold Vss value, wherein the determining that the wake-word is part of the audio output by the loudspeaker is further based at least in part on the first Vss value of the first set of Vss values exceeding the threshold Vss value; and
attenuate the audio output by the loudspeaker.

19. The system of claim 13, the non-transitory computer-readable memory storing further instructions that, when executed by the at least one processor, are further effective to:
- determine a second set of Vss values of the AEC unit over a second time period;
- determine, over the second time period, a first amount of time during which first Vss values of the second set of Vss values are above a threshold value;
- determine, over the second time period, a second amount of time during which second Vss values of the second set of Vss values are below the threshold value;
- determine, for the second time period, a ratio of the first amount of time to the second amount of time;
- determine that the ratio is below a threshold ratio;
- determine that the wake-word is not present in the audio output based at least in part on the ratio being below the threshold ratio; and
- attenuate the audio output by the loudspeaker.

20. The system of claim 13, the non-transitory computer-readable memory storing further instructions that, when executed by the at least one processor, are further effective to:
- determine the first set of Vss values of the AEC unit based at least in part on a correlation between an AEC output signal and the reference signal, wherein the Vss values correspond to a rate at which the AEC unit determines a transfer function between the reference signal and the first input audio signal.

* * * * *